United States Patent [19]
Loy

[11] Patent Number: 4,704,521
[45] Date of Patent: Nov. 3, 1987

[54] OPTO-MECHANICAL SCANNER WITH FIXED-FIELD RANGING DEVICE

[75] Inventor: Fernand R. Loy, Sceaux, France

[73] Assignee: U.S. Philips Corp., New York, N.Y.

[21] Appl. No.: 9,034

[22] Filed: Jan. 29, 1987

Related U.S. Application Data

[63] Continuation of Ser. No. 814,847, Dec. 30, 1985, abandoned.

[30] Foreign Application Priority Data

Jan. 11, 1985 [FR] France .................................. 85 00339

[51] Int. Cl.$^4$ ................................................. G01J 1/20
[52] U.S. Cl. ................................. 250/203 R; 250/236; 250/334; 350/6.8
[58] Field of Search ...................... 356/5; 350/6.4, 6.5, 350/6.6, 6.7, 6.8; 6.9; 250/203 R, 234, 235, 236, 334; 244/3.16, 3.17

[56] References Cited
U.S. PATENT DOCUMENTS 4,542,986  9/1985  Berdanier ................................ 356/5

Primary Examiner—Edward P. Westin
Assistant Examiner—Jessie Ruoff
Attorney, Agent, or Firm—Marc D. Schechter

[57] ABSTRACT

In an opto-mechanical scanner combining scanning and ranging functions the scanning beam, obtained from line-scanning means and frame-scanning means, and the ranging beam converge on a scanning detector array and a ranging detector, respectively. In accordance with the invention, the scanning beams and the ranging beams traverse an arrangement of fixed optical elements which are arranged to ensure that the beam each follow two different optical paths such that the ranging beam bypasses the line-scanning means. This ensures that the ranging beam has a fixed spatial orientation which is independent of the line-scanning means.

4 Claims, 4 Drawing Figures

OPTO-MECHANICAL SCANNER WITH FIXED-FIELD RANGING DEVICE

This is a continuation of application Ser. No. 814,847, filed Dec. 30, 1985, now abandoned.

BACKGROUND OF THE INVENTION

The invention relates to an opto-mechanical scanner having a scanning function and an associated ranging function. The scanning field is obtained by line-scanning and frame-scanning means. The ranging reception field is fixed during the propagation time of a ranging echo whose source is a laser. The beams issuing from the scanning and ranging fields converge on a scanning detector array and on a ranging detector, respectively, which are arranged in the same cooled space.

Thermal imaging systems are known in which the scene is scanned point by point by means of an opto-mechanical scanner. Generally, these thermal cameras are equipped with infrared optical systems of large diameter.

When the thermal camera is used in conjunction with a laser ranging device the optical system of the ranging device also has a large diameter.

In order to reduce the dimensions and price of the arrangment it is advantageous to use the same optical system for scanning and for laser reception. Laser light is emitted externally of the thermal camera. The laser emitter uses a separate optical system whose axis extends parallel to the axis of the optical system for laser reception. It is also advantageous to arrange the scanning and ranging detectors in the same cooled space, so that only one space has to be cooled.

It is conceivable that the scanning channel and the ranging channel share common elements from the entrance optical system to the detector. This is possible in the case of scanners having only one scanning direction. In "parallel" scanners, which have as many detectors as there are scanning lines, this is the case because these scanners are of the slow-scanning type.

In "series" or "series-parallel" scanners, which have two scanning directions as in conventional television, line scanning is very rapid and frame scanning is slower. The orientation of the field being scanned varies very rapidly in the line direction, to such an extent that during the propagation time of the laser pulse between its emission and reception the orientation of the laser reception field has changed through an angle equal to several times the laser field. In order to overcome this problem different methods may be adopted.

It is possible, for example, to bypass the line-scanning by means of dichroic plates which reflect the laser radiation and which transmit the remainder of the infrared spectrum.

Alternatively, it is possible to bypass the line scanning sequentially by means of switchable optical elements.

One method has the disadvantage that elements such as the dichroic plates absorb radiation. The other method has the disadvantage that switchable elements always give rise to synchronization problems.

SUMMARY OF THE INVENTION

It is an object of the invention to solve these problems by means of a method which ensures that the ranging beam has a fixed orientation, which is independent of the line scanning.

According to the invention, the scanning beam and the ranging beam traverse a common entrance optical system and an arrangement of fixed optical elements. The latter are arranged to make the beams follow two separate optical paths such that the ranging beam bypasses the line-scanning means. This ensures that the ranging beam has a fixed orientation which is independent of the line scanning. The scanning function and ranging function are simultaneous and require no switching of optical elements. The laser is pulsed in a specific position of the frame scanning means.

This arrangement is very suitable for use in the modular thermography system MTS. However, the same principle may also be employed in other scanning systems.

DESCRIPTION OF THE PREFERRED EMBODIMENT

Figure 1:
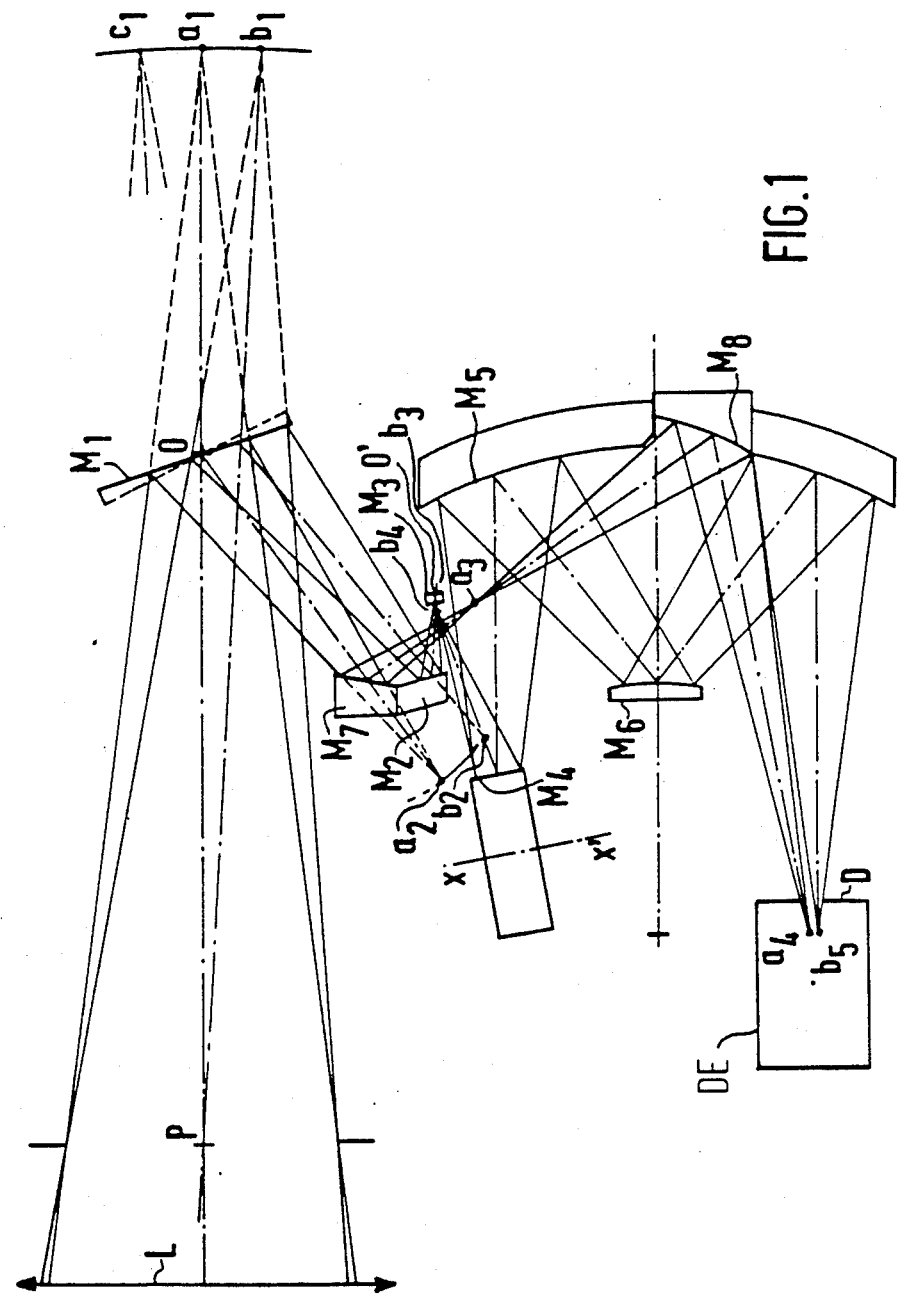
FIG. 1 is a schematic diagram of an opto-mechanical scanner according to the invention.

According to the invention, the opto-mechanical scanner shown in FIG. 1 comprises two different optical paths for the scanning channel and the ranging channel without the use of switchable optical elements and without any significant reduction in performance of each of the channels.

The scanning channel extends through the frame scanning means and through the line scanning means. The ranging channel extends only through the frame scanning means.

The scanning function is provided by the following optical elements:

the exit pupil P of the objective L which is common to the two channels, the frame-scanning mirror M1 which is movable about an axis O perpendicular to the plane of the Figure, the vertical field of the objective indicated by $a_1$, $b_1$, $c_1$, which are the locations where the beams issuing from the exit pupil converge, the diverting mirror M2, the spherical field mirror M3, which is rotatable in synchronism with $M_1$ about an axis O' perpendicular to the plane of the Figure, the line-scanning polygon M4 which rotates about an axis XX' which extends in the plane of the Figure, and the image-transfer means M5, M6 comprising spherical mirrors.

The mirror M5 is a concave spherical mirror which is formed with an opening which is adapted to receive another optical element used for the ranging function. The mirror M6 is a concave spherical mirror which is concentric with M5.

The movement of the frame-scanning mirror M1 is negligible with respect to the size of the ranging field during the propagation time of the laser echo which is at the most 60 μs for a target situated at a distance smaller than 9 km.

The frame-scanning mirror M1 is shown in solid lines in a position in wich the point of convergence $b_1$ of the scanning beam issuing from P is situated at the lower limit of the vertical field.

M2 reflects the beam from the frame-scanning mirror M1 to the field mirror M3, which projects this beam onto a face M4 of the line-scanning polygon. The beam issuing from M4 is successively routed to the upper part of M5, subsquently to M6 and finally to the lower part of M5 where it is reflected as a beam which converges on the scanning detection system which comprises for example an array of detectors.

$b_2$ is the image of $b_1$ formed by M1,
$b_3$ is the image of $b_2$ formed by M2,
$b_4$ is the image of $b_3$ formed by M3,
$b_5$, which is the image of $b_4$ obtained after the beam has passed over the line-scanning face M4 transferred by M5 and M6, is the point where the scanning detector is located.

The ranging function is provided by the following optical elements:
the exit pupil P of the objective,
the frame-scanning mirror M1,
the plane diverting mirror M7, and
the elliplical mirror M8 arranged in the opening formed in the spherical mirror M5.

$a_1$ is the point of convergence in the vertical field of the ranging beam issuing from P. This beam, which after having been reflected by the frame-scanning mirror M1, is routed to the elliptical mirror M8 by M7. The beam reflected by M8 converges on the ranging detector.

$a_2$ is the image of $a_1$ formed by M1,
$a_3$ is the image of $a_2$ formed by M7,
$a_4$, which is the image of $a_3$ obtained after reflection from M8, is the location of the ranging detector.

$a_3$ and $a_4$ also are the foci of the elliptical mirror M8.

It is to be noted that for the illustrated position of the frame mirror M1 shown in FIG. 1 the point $b_1$ of the scanning field and the point $a_1$ of the ranging field are not the same. This means that at the instant at which the ranging field $a_1$ is in the center of the camera field, it is point $b_1$ of the scanning field that is scanned by the imaging channel. The ranging field need not necessarily be situated in the center of the scanning field. It may be situated anywhere between $b_1$ and $c_1$ ($c_1$ being the upper limit of the scanning field for the position of the mirror M1 shown in dotted lines in the Figure). It suffices to fire the laser when M1 passes through the corresponding position.

The source emitting the ranging pulse is, for example, a $CO_2$ laser emitting at 10.6 $\mu$m for cameras operating in the 8-12 $\mu$m band.

The raging and scanning detectors are arranged in the same Dewar vessel, so that only one cryogenic system is required.

The scanning and ranging beams, which converge in $b_5$ and $a_4$, respectively, are superposed and the cold shield D limits the field of view of the detectors to the effective field of view.

Figure 2:
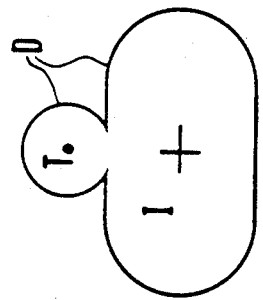
FIG. 2 shows the shape of the cold shield for the detectors.

The shield shown in FIG. 2 has two openings: the lower one for the scanning beam I and the upper one for the ranging beam T.

It is possible to ensure that the entire ranging beam passes through the cold shield whose dimensions are indictated by the scanning channel and thus do not affect the sensitivity of the scanning detector. To achieve this two requirements must be met:

1. The image transfer means of the scanning device should have a magnification which differs from that of the image transfer means of the ranging device in such a way that for the same dimensions of the entrance pupils of the scanning device and the ranging device the aperture of the beam which converges on the ranging detector is smaller than the aperture of the beam which converges on the scanning detector.
2. The respective positions of the scanning detector and the ranging detector in the Dewar vessel should be chosen in an appropriate manner so that the ranging beam enters the interior of the Dewar vessel whose dimensions are indicated by the scanning channel.

If these requirements are met the addition of the ranging channel will not affect the performance of the scanning channel.

Figure 3:
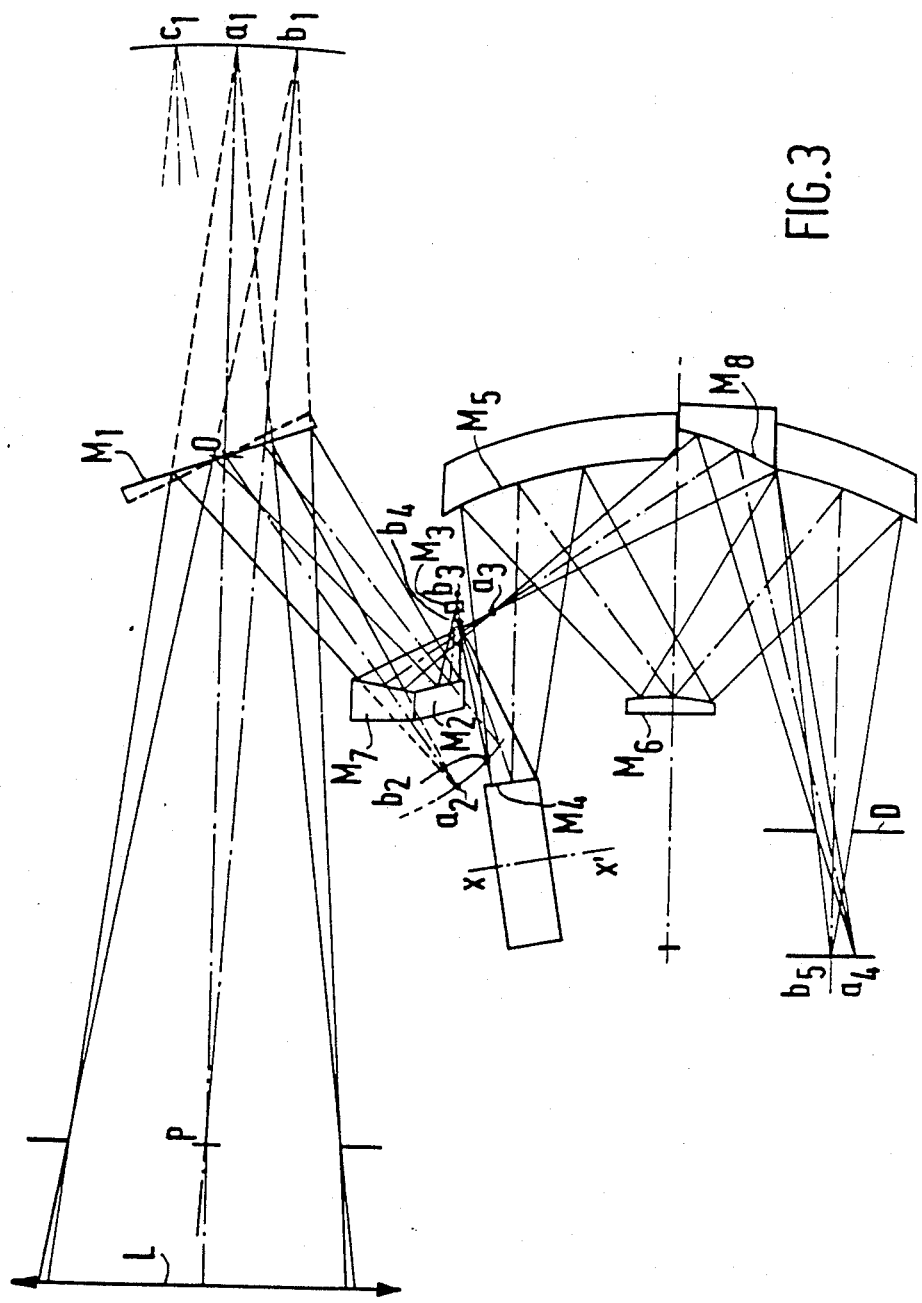
FIG. 3 schematically shows an opto-mechanical scanner according to the invention in which the entire ranging beam traverses the cold shield which is dimensioned for the scanning beam.

The device shown in FIG. 3 is identical to that in FIG. 1 but also meets these requirements.

Figure 4:
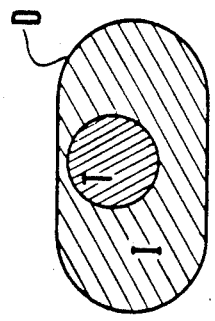
FIG. 4 shows the position of the ranging beam in the cold shield in the scanner of FIG. 3.

FIG. 4 shows the position of the ranging beam T inside the cold shield D whose dimensions are adapted to permit the passage of the scanning beam I.

What is claimed is:

1. An opto-mechanical scanner having a scanning function and an asociated ranging function, the scanning field being obtained by line-scanning and frame-scanning means and the ranging-reception field being fixed during the propagation time of a ranging echo whose source is a laser. the beams issuing from said fields converting on a scanning detector array and on a ranging detector respectively, which are arranged in the same cooled space, characterized in that said scanning beam and said ranging beam traverse a common entrance optical system and an arrangement of fixed optical elements arranged to make said beams follow two separate optical paths such that the ranging beam bypasses said line-scanning means, which ensures that it has a fixed orientation which is independent of the line scanning, said scanning function and ranging function being simultaneous and requiring no switching of optical elements, and the laser pulse being emitted in a specific position of said frame-scanning means.

2. A scanner as claimed in claim 1, characterized in that from the scene towards the detectors, said arrangement of optical elements comprises:
for the scanning beam:
 a plane mirror, or frame-scanning mirror, which constitutes said frame-scanning means, which is movable about an axis perpendicular to the plane of symmetry of said optical arrangement and which projects the scanning beam issuing from the exit pupil of the objective onto a plane mirror which reflects to the beam towards a spherical field mirror, the beam issuing from said field mirror being reflected from a face of a polygon which constitutes said line-scanning means, and which is movable about an axis which extends in the plane of symmetry of said optical arrangement, the beam issuing from said line-scanning polygon being routed further by an image transfer means comprising two concentric spherical mirrors, one concave and one convex mirror, which converge said beam on the scanning detector array, for said ranging beam:
 said frame-scanning mirror which projects the ranging beam issuing from the exit pupil of the objective onto another plane mirror which reflects said beam onto a further image transfer means comprising an elliptical mirror arranged in an opening in said concave spherical mirror of the image transfer means of the scanning channel and which converges said ranging beam on the ranging detector.

3. A scanning as claimed in claim 2, characterized in that the respective positions of the scanning and ranging detectors in the cooled space are selected in an appropriate manner, said image transfer means of the scanning channel having a magnification which differs from that of the image-transfer means of the ranging channel in such a way that for the same diameter of the entrance pupil in the scanning channel and the ranging channel the aperture of the beam which converges on the ranging detector is smaller than the aperture of the beam which converges on the scanning detector, and entire ranging beam passes through the cold shield which is dimensioned in conformity with the scanning beam, and the performance of the scanning channel is not affected by the addition of the ranging channel.

4. An opto-mechanical scanner comprising:
a cooling vessel;
a scanning detector array arranged in the cooling vessel;
imaging means for generating an image of a scene, said image being arranged at the scanning detector array;
line-scanning means for scanning the image of the scene across the scanning detector array in a line direction;
frame-scanning means for scanning the image of the scene across the scanning detector array in a frame direction transverse to the line direction;
a laser source for illuminating an object in the scene with a ranging beam, said object reflecting the ranging beam back to the scanner;
a ranging detector arranged in the cooling vessel;
focusing means for focusing the reflected ranging beam onto the ranging detector; and
pulse means for causing the laser to emit ranging beam pulses;
characterized in that the imaging means and the focusing means comprise:
an entrance optical system for receiving radiation from the scene and for receiving the reflected ranging beam; and
an arrangement of fixed optical elements for receiving radiation from the scene and for receiving the reflected ranging beam, said fixed optical elements guiding the ranging beam to the ranging detector while bipassing the line-scanning means so as to ensure that the ranging beam has a fixed orientation independent of the line-scanning means; and
characterized in that:
the pulse means causes the laser to emit ranging beam pulses at a specific position of the frame-scanning means; and
the radiation from the scene is incident on the scanning detector array and the ranging beam is incident on the ranging detector simultaneously without switching optical elements.

* * * * *